United States Patent [19]
Kugler

[11] 3,780,580
[45] Dec. 25, 1973

[54] LOW PRESSURE INDEX CONTINUOUS INTEGRATOR

[75] Inventor: Carl J. Kugler, Philadelphia, Pa.

[73] Assignee: The Singer Company, New York, N.Y.

[22] Filed: Sept. 12, 1972

[21] Appl. No.: 288,448

[52] U.S. Cl. .................... 73/233, 74/194
[51] Int. Cl. ......................... G01f 1/12
[58] Field of Search .............. 73/233; 74/194

[56] References Cited
UNITED STATES PATENTS

| | | | |
|---|---|---|---|
| 3,538,766 | 11/1970 | Kugler | 73/233 |
| 3,472,072 | 10/1969 | Kunstadt | 73/233 |
| 3,073,157 | 1/1963 | Gehre | 73/233 |
| 3,301,054 | 1/1967 | Ebert | 73/233 |
| 3,530,715 | 9/1970 | Steins | 73/233 |

FOREIGN PATENTS OR APPLICATIONS

| | | | |
|---|---|---|---|
| 1,541 | 1/1903 | Great Britain | 73/233 |

Primary Examiner—Herbert Goldstein
Attorney—Marshall J. Breen et al.

[57] ABSTRACT

A low pressure index continuous integrator having a diaphragm stack transmitting pressure changes in the throughput flow of a meter through a balanced linkage means to a continuous integrator. The motion of both the diaphragm stack and the continuous integrator is linear, so as to eliminate any possible geometric error in the corrected volumetric measurement of the throughput flow of the meter. The diaphragm stack is mounted on a frame fixedly connected to the housing of the meter. The frame provides an integral block to prevent overexpansion of the diaphragm stack, and a fixed pivot for the linkage means.

3 Claims, 6 Drawing Figures

LOW PRESSURE INDEX CONTINUOUS INTEGRATOR

BACKGROUND OF THE INVENTION

Heretofore, in the prior art, various measuring devices have used pressure compensators of one type or another. Some of these instruments have worked reasonably well, but only in the middle to high pressure range. However, all of these instruments have been only marginally accurate in the low pressure range, i.e. 0–5 PSIG. One major shortcoming has been the use of one or more radial outputs which resulted in the introduction of geometric error in converting the radial output to linear.

SUMMARY OF THE INVENTION

It is therefore an object of the present invention to provide an improved low pressure index continuous integrator for measuring the throughput flow of a meter which overcomes the prior art disadvantages; which is simple, economical, reliable and accurate; which uses a balanced linkage means; which uses a diaphragm stack having a linear output motion; which uses a continuous integrator having a linear motion; which uses a frame for mounting the diaphragm stack and blocking (limiting) the motion thereof, and for providing a fixed pivot for the linkage means; and which eliminates any possible geometric error by using a diaphragm stack and continuous integrator, each partaking of linear motion.

Other objects and advantages will be apparent from the following description of one embodiment of the invention and the novel features will be particularly pointed out hereinafter in the claims.

BRIEF DESCRIPTION OF THE DRAWINGS

This invention is illustrated in the accompanying drawings in which.

DESCRIPTION OF THE INVENTION

Figure 1:
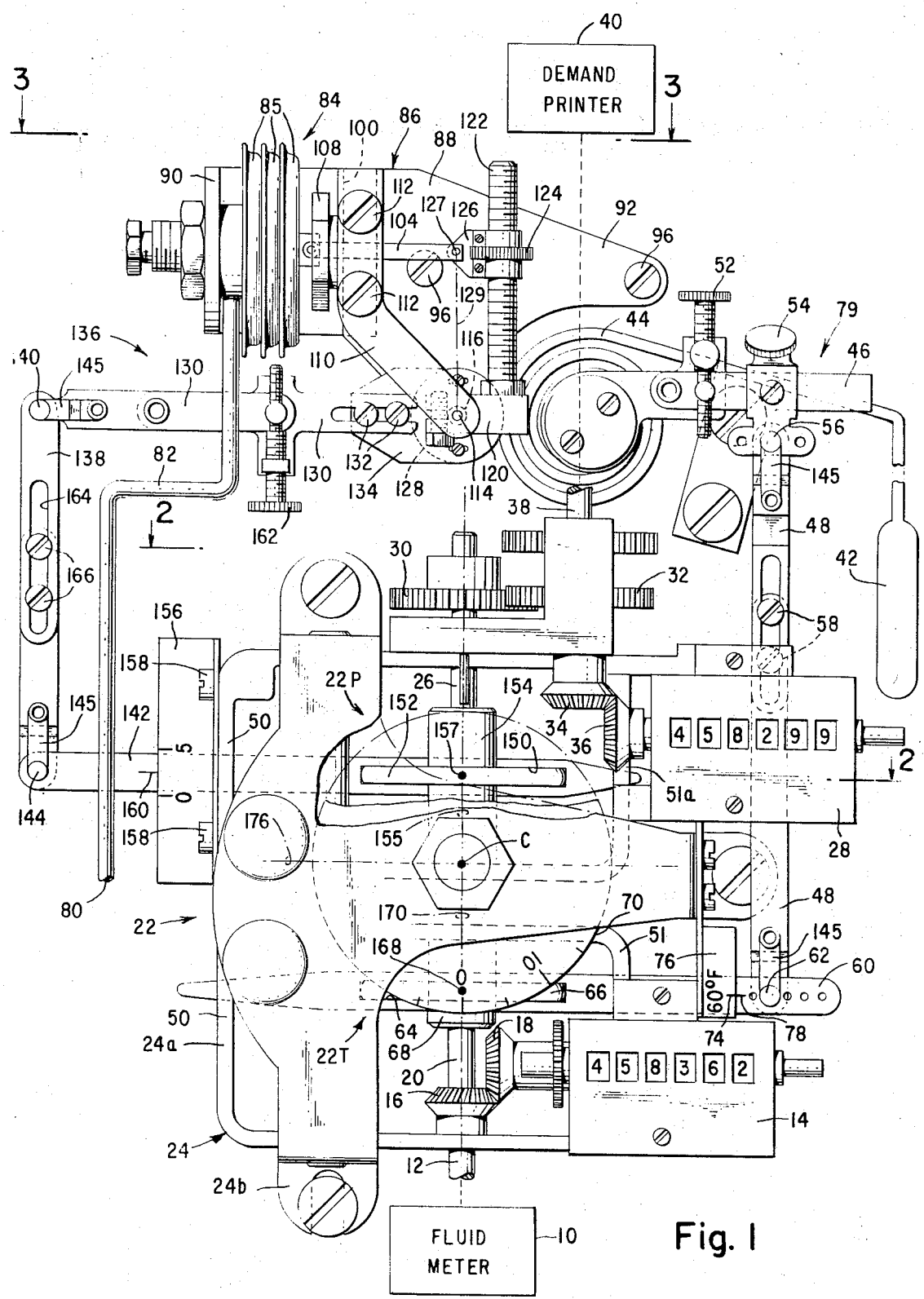
FIG. 1 is a partially diagrammatic elevational view of a metering apparatus provided with a low pressure index continuous integrator in accordance with the present invention.

In the illustrated embodiment of the invention, a fluid meter 10 of any conventional design is represented in FIG. 1. The meter 10 is used to measure the throughput flow of a fluid, such as a gas or other elastic fluid (a vapor). The meter 10 transmits its output to a shaft 12, and operates an uncorrected counter 14 through bevelled gears 16 and 18, the counter being provided for a visual check of the operation of the meter 10.

Figure 3:
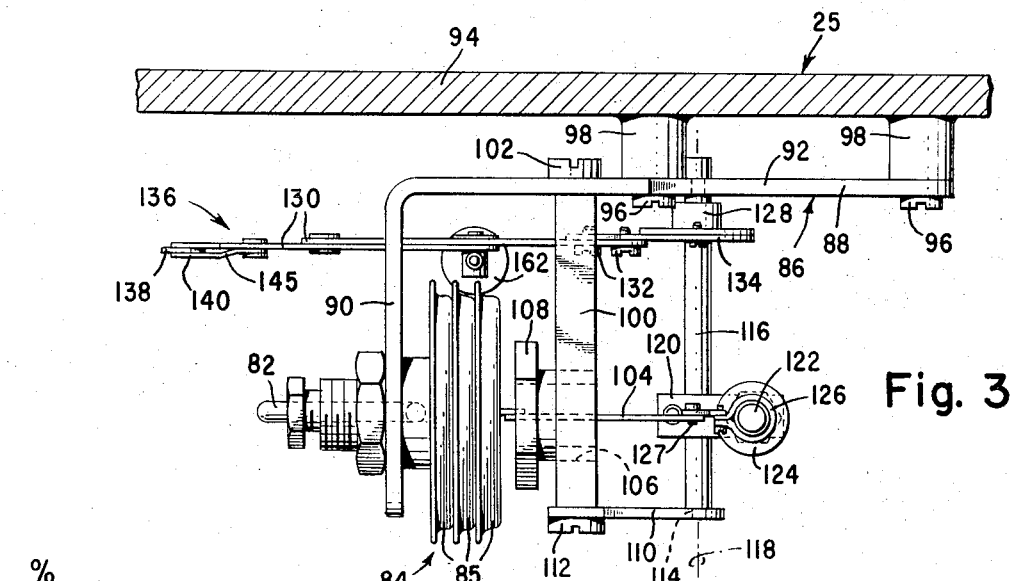
FIG. 3 is a top plan view taken along line 3—3 of FIG. 1 showing the frame carrying the diaphragm stack and part of the linkage means.

The input shaft 20 of a continuous integrator designated generally as 22, is common with the shaft 12 and journaled in a lower frame, having portions 24a and 24b, which is suitably connected to a housing 25, a portion of which is shown in FIG. 3, carried by the fluid meter 10. The continuous integrator 22 includes a temperature compensating mechanism 22T and a pressure compensating mechanism 22P, and will be briefly described herein. A more complete understanding of integrator 22 may be had by reference to U.S. Pat. No. 3,538,766, granted Nov. 10, 1970.

Accordingly, the shaft 12 rotates the bevelled gear 16 and the input shaft 20. An output shaft 26 of the compensating mechanism 22P drives a corrected counter 28 through a gear train including gears 30 and 32, and a pair of bevelled gears 34 and 36. Gears 32 and 34 are affixed to driven shaft 38 which may be arranged to operate a demand or printing counter indicated diagrammatically at 40. Such demand printers or printing counters are well known, and periodically print a counter indication on a moving chart to produce a record from which times and corresponding counter indications can be determined. Counters 28 and 40 indicate the throughput flow volume reduced to standard conditions.

Figure 2:
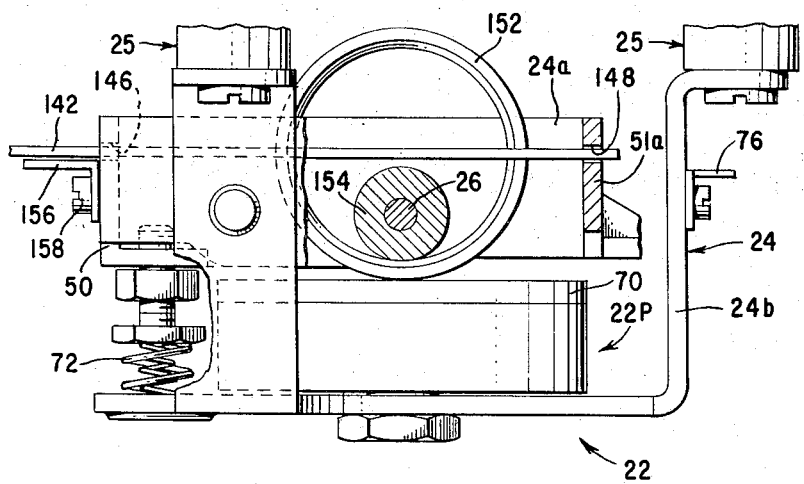
FIG. 2 is a top plan view taken along line 2—2 of FIG. 1 showing the continuous integrator.

A temperature sensing element 42 is arranged to sense the temperature of the fluid at the meter location, and to operate a bourdon tube 44. The bourdon tube 44 rotates arm 46 to raise or lower link 48. The arm 46 has an adjustment screw 52 to adjust the relative position of arm 46. A slidable link connector 54 is carried on the arm 46 outwardly of the adjusting screw 52 and has a ball bearing pivot connection at 56 with the upper end of link 48. The link 48 has two portions connected to each other by a pair of screws 58 threadedly received in one portion after passing through a longitudinal slot formed in the other portion. The link 48 can thus have its length adjusted. The lower end of link 48 is connected to a yoke 60 by a ball bearing pivot at 62. The yoke 60 extends through slots (not shown) formed in the opposite legs 50 and 51 of the lower frame 24. The yoke 60 serves to connect the temperature linkage assembly 79 with the temperature compensating mechanism 22T. The yoke 60 has a longitudinal slot 64 in which a ring 66 is rotatively trapped. The ring 66 encircles a roller 68 and is clamped between the roller 68 and a rotational disk 70. The disk 70 will rotate about a center point C and, as shown in FIGS. 1 and 2, is spring biased toward the roller 68 by the loading of a double spring 72 disposed between the portions 24a and 24b of the frame 24. The roller 68 is affixed to the input shaft 20 to be rotated thereby, so as to rotate the ring 66 and the disk 70 at a speed commensurate with the radial distance from the center point C to the ring 66 upon the disk 70 for purposes to be explained more fully hereinafter under the pressure compensating mechanism 22P. The ring 66 is guided by the yoke 60 which is controlled by the link 48 and arm 46. As the temperature varies, the yoke 60 will be shifted by the link 48 and arm 46 to move upwardly or downwardly, and cause the yoke 60 to steer the ring 66 in the manner of a front wheel of a bicycle. As soon as the ring 66 is tilted, it attempts to straighten itself in line with the yoke 60 while being held within the slot 64 of the yoke 60. Accordingly, as the temperature varies, the radial position of the ring 66 in relation to the disk 70 will change proportionately. In FIG. 1, the reference temperature is indicated as 60°F as at the index 74 of an index plate 76 carried by the frame 24. The yoke 60 has an index 78 which, through adjustment of the length of the link 48 will coincide with the index 74 at the standard or base temperature of 60°F. The connected arm 46, link 48 and yoke 60 combine to define a temperature linkage assembly 79.

Opening 80, which communicates with the fluid entering the meter 10, is connected through capilary tube 82 to a measuring element comprising a "Ni-Span'C'" diaphragm stack 84 made up of a plurality of diaphragms 85, shown in FIGS. 1 and 3. A capilary tube 82 is made of plated copper tubing to eliminate any line stresses being transmitted to the diaphragm stack 84. The diaphragm stack 84 is mounted to an upper or main frame 86 having an L-shaped plate 88 to which the diaphragm is connected to the outwardly extending leg 90. An inner leg 92 of the plate 88 is connected to a wall 94 of a housing 25 as illustrated in FIG. 3, by screws 96 threadedly received in bosses 98. Intermediate the diaphragm stack 84 and the boss 98, a transverse member 100 is connected to the inner leg 92 by a pair of screws 102, so as to extend substantially parallel to the outer leg 90 at approximately the same length and depth thereof.

An arm 104 is connected at the front end of the diaphragm stack 84 to extend through an aperture 106 formed in the transverse member 100 in alignment with the center of the diaphragm stack 84. A block nut 108, having a central opening through which the arm 104 passes, is threadedly received in the aperture 106 in adjusted position a predetermined distance from the diaphragm stack 84. The block nut 108 serves to limit the outer movement of the diaphragm stack 84 to prevent rupture of any of the diaphragms 85 thereof, due to overpressure conditions resulting from excessive pressure in the fluid meter 10. A journal bracket 110 is mounted to the outer end of the transverse member 100 by screws 112. The journal bracket 110 slopes outwardly below member 100 and away from the diaphragm stack 84 to define one point of a fixed pivot 114 by a small circular opening which journals a reduced diameter portion of a shaft 116. The inner leg 92 carries the journal for the other reduced diameter portion of the shaft 116 which permits the shaft 116 to pivot at 114 about its axis 118.

A hub 120 illustrated in FIGS. 1 and 3 is affixed to the shaft 116 and carries an offset adjustment screw or arm 122 connected thereto. A nut 124 is threadedly received on the screw 122 and is entrapped by a tab 126 to which the outer end of arm 104 is connected at point 127. At midrange pressure, the point 127 is in superposition to the pivot 114, and a hypothetical straight line 129 intersects point 127 and pivot 114. The line 129 will be parallel to screw 122. The exact location and movement of arm 104 may be adjusted by rotation of nut 124 along the screw 122. A second hub 128 shown best in FIG. 3 is affixed to the shaft 116 adjacent the inner leg 92 and has connected thereto a link 130 by a pair of screws 132 passing through an open longitudinal slot formed at one end of the link 130, to be threadedly received in an enlarged plate 134 mounted on the hub 128, as illustrated in FIGS. 1 and 3. The link 130 is part of a transfer link assembly 136 which also includes the previously mentioned arm 104, screw 122, shaft 116, link 138 and yoke 142. The link 138 is connected by a ball bearing pivot at 140 to link 130. The yoke 142 is connected by a ball bearing pivot at 144 to link 138. The ball bearing pivot referred to at 56, 62, 140 and 144, include a ball affixed to one link disposed in an aperture formed in the other link and held in position by a spring finger 145 affixed to the first link having the ball.

Figure 5:
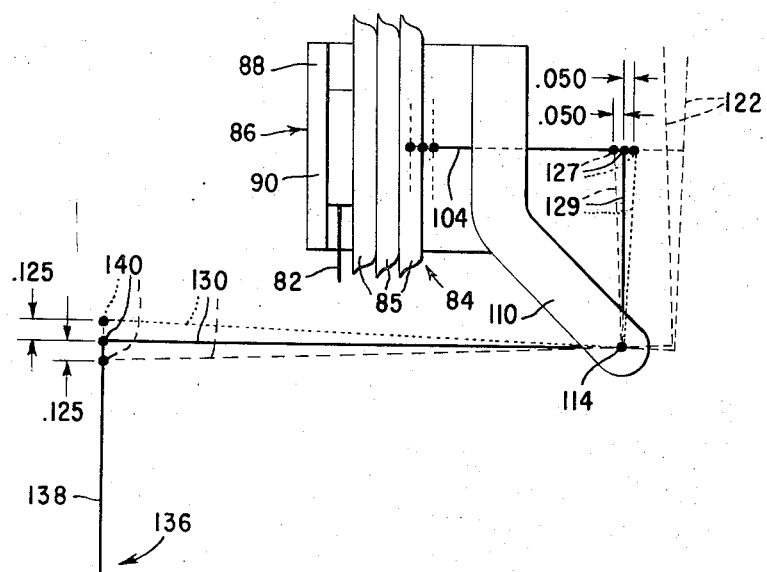
FIG. 5 is a diagrammatic elevational view of a simplified form of FIG. 1 showing the extremes of travel of the diaphragm stack, the linkage means and the continuous integrator of the present invention.

The yoke 142 passes through slots 146 and 148 formed in opposite legs 50 and 51a of the lower frame 24. The yoke 142 has an intermediate slot 150 which receives a ring 152 which is clamped in position between a roller 154 mounted on the output shaft 26 and the rotative disk 70. The yoke 142 will operate in a similar manner as that of yoke 60. Accordingly, the yoke 142 will be controlled by the movement of the links 130, 138 and arms 104, 122 of the transfer link assembly 136. As the pressure varies, the diaphragm stack 84 will extend or retract the arm 104 in a linear motion to cause the arm 122 to pivot about the pivot point 114 which is coincident to the axis 118 of the shaft 116. The angular relationship between arm 122 (or hypothetical line 129) and link 130 remains fixed and in FIGS. 1 and 5, is shown to be substantially 90°. The pivoting action at pivot point 114 results from the combined movement of arms 104 and 122 which act as a crank to cause link 130 to pivot about pivot point 114. Accordingly, any turning of the shaft 116 causes the link 130 to pivot and also to shift the connected link 138 and yoke 142 correspondingly. Thus, any change in position of the diaphragm stack 84 causes the yoke 142 to shift and to steer the ring 152 in the manner of a front wheel of a bicycle, in that as soon as the ring 152 is tilted, it attempts to straighten itself, thus partaking of a linear motion along a hypothetical radial line 155 illustrated in FIGS. 1, 5 and 6, on the contact surface of the disk 70. A pressure index plate 156 is mounted to the lower frame 24 by screws 158 adjacent the yoke 142 as illustrated in FIG. 1, and is marked to indicate the range of pressure from 0–5 PSIG. The yoke 142 carries an index mark 160 which is set to correspond to and indicate the pressure of the fluid in the meter 10. The pressure shown in FIG. 1 is at midrange, and the index mark 160 reads 2.5 PSIG on the index plate 156. The transfer link assembly 136 is suitably adjusted so as to accurately indicate the pressure at mark 160 and will proportionately change the position of the ring 152 upon the disk 70, and for this purpose has several setup and adjustment means. For example, the transfer link assembly 136 may be adjusted for setup at one or more locations, as follows: (1) at screw 122 and nut 124, (2) at the open ended slot by screws 132 of the link 130, (3) by the adjustment screw 162 located at the midpoint interconnection of the link halves which form the link 130 or (4) at the longitudinal slot 164 which serves to interconnect the link halves of link 138 by screws 166.

The ring 152 will always contact the disk 70 on a point along the hypothetical line 155 so as to define a movable or floating pivot designated generally as 157, at such point of contact. The line 155 can also be termed an axis of rotation. A plane substantially parallel to link 138, passing through either the roller 154 or movable pivot 157 also will be substantially parallel to line 129. This configuration of the transfer link assembly 136, with one fixed pivot at 114 and one movable pivot at 157, acts to balance the assembly 136 in that any errors caused by movement of the links 130, 138 or yoke 142 will cancel each other out, or be offset by the positioning of an opposite member.

The disk 70 is common to both the compensating mechanisms 22T and 22P of the continuous integrator 22. The temperature compensating mechanism 22T also includes input shaft 20, roller 68 and ring 66. The pressure compensating mechanism 22P includes ring 152, roller 154 and output shaft 26.

The operation of compensating mechanisms 22T and 22P each take advantage of the characteristics of the floating ring in order to accurately regulate the drive ratio between input shaft 20 and output shaft 26. Viewing the shaft 20 in FIGS. 5 and 6 from the bottom of the drawing looking up into the shaft 20, it will rotate in a counterclockwise direction, and impart a counterclockwise rotation to disk 70 through ring 66. If the point of contact between ring 66 and the disk 70 in nearer the outer edge of the disk, the disk will be driven relatively slowly, while if the point of contact is nearer the center of the disk, i.e. the radial distance from the center of the disk being smaller, the rate of rotation of the disk with respect to the rate of rotation of the shaft 20 will increase. Assuming that the initial temperature of the fluid in meter 10 is 60°F, the ring 66 will be located as shown in FIG. 1 which corresponds to the point 168 of FIG. 6. This is a stable position, and the ring will tend to remain in the same position so long as the yoke 60 is not moved responsive to temperature changes. Movement of the outer end of the yoke 60 by the temperature link assembly 79, upwardly as illustrated in FIG. 1, in response to a termperature decrease, will cause the axis of ring 66 to be moved out of parallelism with the axis of roller 68. The ring 66 will be, in effect, "steered" by yoke 60, and will be driven in a direction such that the axis of the ring again becomes parallel to the axis of the roller 68, but the point of contact between the ring and the face of the disk 70 will be nearer to the center C of the disk 70 and aligned with the pivot 62 at the end of the yoke 60. Thus, ring 66 returns to an orientation in which its axis is parallel to the axis of roller 68 and in which the plane of its edge is normal to the radius of the disk extending through the point of contact between the disk 70 and the ring 66. Of course, the point of contact, is now closer to the center C of the disk 70, as that the disk is driven at a greater speed.

An increase in temperature will likewise cause ring 66 to move toward the outer edge of the disk 70.

Figure 6:
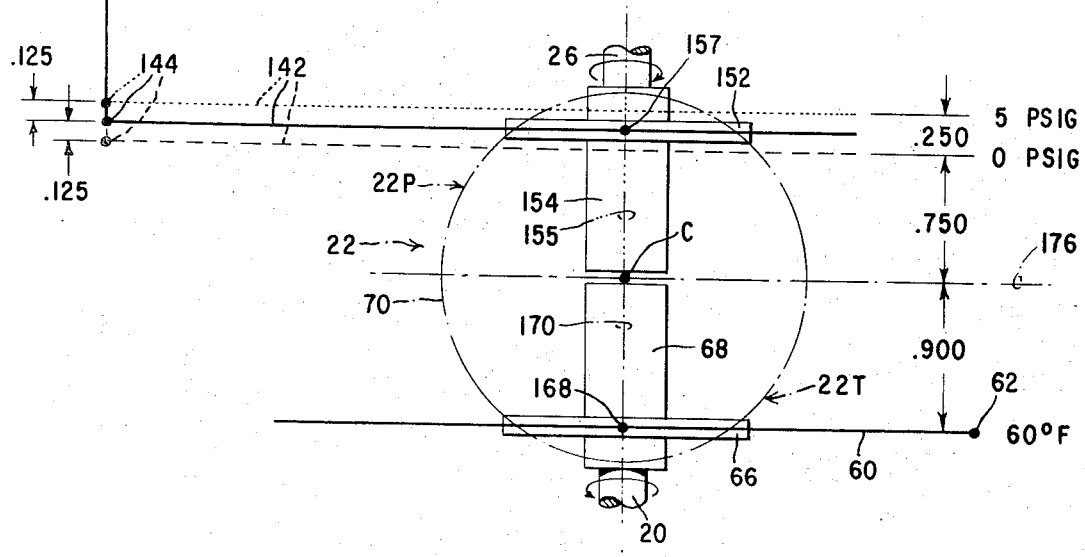
FIG. 6 is a diagrammatic elevational view of the continuous integrator illustrating the manner of its operation.
Figure 6:
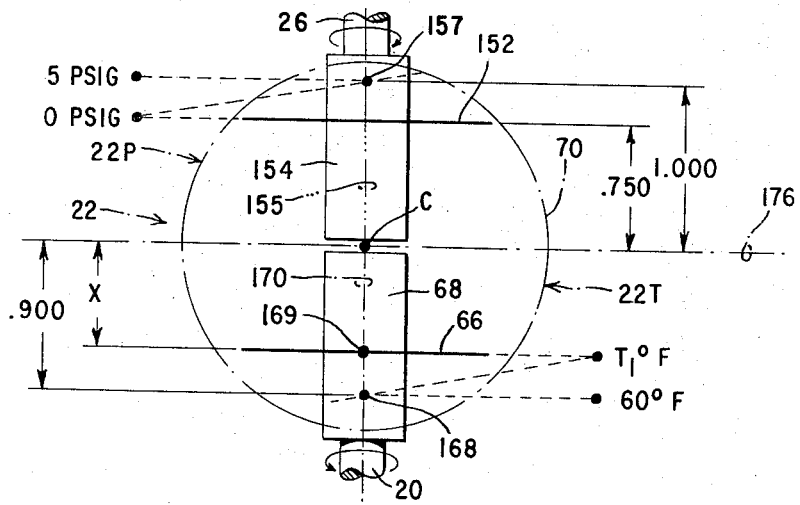

The ring 66 is shown diagrammatically in FIG. 6 in which it moved from an initial point 168 at 60°F upon a decrease in temperature to a second point 169 at its new radial distance from the point C of the disk 70. The original point of contact 168 is shown in FIG. 6 in a preferred form at a radial distance measured along a common axis 170 of shafts 20 and 26 from the center C to point of contact 168 of 0.900 inches, which corresponds to the position of the ring 66 at 60°F, and the final radial distance of ring 66 from point 169 to the center point C will be "X" at $T_1°F$. The hypothetical line 155 is coincident to the axis 170.

The compensating mechanism 22P is also shown diagrammatically in FIG. 6, wherein the radial distance measured along the line 155 from the point C to the contact point of the ring 152 upon the disk 70 will vary from 0.750 at 0 PSIG to 1.000 with the solid line position of ring 152 being shown corresponding to the 0 PSIG location. Accordingly, the position of ring 152 is directly proportional to the expansion or contraction of the diaphragm stack 84, which in turn, means the revolutions of the output shaft 26 are directly related to the pressure being measured.

The transfer link assembly 136 and the pressure compensating mechanism 22P of the continuous integrator 22 is illustrated in FIG. 5 to show the limits of motion thereof within the pressure range of 0 PSIG and 5 PSIG. The transfer link assembly 136 and the pressure compensating mechanism 22P are shown in the solid line representation corresponding to that at midrange or 2.5 PSIG, with the dotted line representation of the components representing the position corresponding to that of the fluid pressure being equal to 5 PSIG, and the dashed line representation corresponding to the position thereof at 0 PSIG. The movement of the arm 104 caused by the expansion or contraction of the diaphragm stack 84 will result in a substantially straight line movement at the point connection 127 with respect to the fixed pivot 114. A hypothetical radial line 129 connects the pivot 114 with the point 127. The movement of point 127 relative pivot 114 between the range of 0–5 PSIG will total 0.100 inches, with a travel of 0.050 inches on either side of the midrange. The maximum deviation of the linear motion at point 127 will be 0.001 inches. At point 140 the range of travel to either side of the solid line ring 130 shown at midrange, will be 0.125 inches, with a maximum deviation of 0.0005 inches. The motion of the ring 152 will correspond to that of the yoke 142 and measured from the midpoint will be 0.125 on either side thereof within the pressure range of 0–5 PSIG. Measured from a center line 176 passing through the center point C, and disposed perpendicular to the axis 170, the ring 152 travel will vary between 0.750 to 1.000 inches correspondingly for 0–5 PSIG, respectively.

The position of the temperature ring 66 measured from the center line 176 at the base temperature of 60°F will be 0.900 inches. Any movement of the ring 66 will be proportional to the changes in the base temperature so as to cause the ring to move upwardly or downwardly along the surface of the disk 70, so as to decrease or increase the radial distance between the ring 66 and the center C.

As described hereinbefore, the fluid passing through the meter 10 will drive the input shaft 20 and the ring 66 to rotate the disk 70 which, in turn, rotates the ring 152 to drive the shaft 26. Since the position of the rings 66 and 152 will be proportional to any changes in the temperature or pressure, the continuous integrator 22 through its output shaft 26 will operate the corrected counter 28 to indicate the actual volume of flow at all times.

In the event that the fluid in meter 10 was flowing at either a constant temperature or constant pressure, one or the other of the rings 66 or 152 either would be maintained at a suitable radial distance on the disk 70, or replaced by a suitable drive mechanism.

The transfer link assembly 136 utilizes the main frame 86 to link up one end thereof with the diaphragm stack 84, while the other end thereof uses the lower frame 24 to link up with the pressure compensating mechanism 22P. The main frame 86 also serves the dual function of providing: (1) the fixed pivot 114 of the transfer link assembly 136 and (2) the block nut 108 which protects against overexpansion of the diaphragm stack 84 by physically stopping the outward motion of the stack 84 before overexpansion can occur.

The rings 66 and 152 of the temperature compensating mechanism 22T and pressure compensating mechanism 22P, respectively, can be shifted to a new position upon the application of less than 2 grams of force. In the case of the pressure compensating mechanism 22P, the diaphragm stack 84 has an effective area of 0.800 inches. Whn this area is multiplied by a 5 PSIG gas pressure, up to four pounds of force or over 1,800 grams are available to move the transfer link assembly 136, so it is apparent that the transfer motion will be precise and accurate with no perceptible hysteresis loss.

Since the output motion of the diaphragm stack 84 is linear, and the ring 152 travel in also linear, no geometric error is created, and the low pressure measurement of the throughput flow of the fluid in meter 10 has a far greater accuracy than was possible with previous prior art devices.

Figure 4:
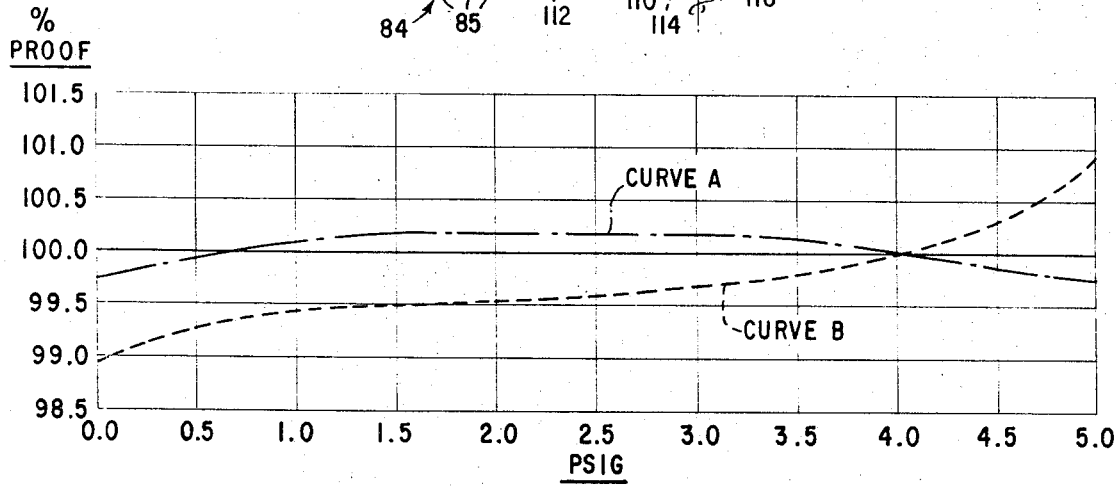
FIG. 4 is a graphic illustration showing a chart of the percent proof vs. PSIG of Curve A, representing the present invention, and Curve B, representing a prior art device.

FIG. 4 is a graphic illustration of two types of continuous integrators, each measured at constant temperature with a variable pressure. Curve A represents the present invention wherein the continuous integrator includes a diaphragm stack 84 or the like to sense and transmit the variations in pressure through the range of 0–5 PSIG. The accuracy of curve A is within ± 0.25 percent over the full range of pressure, varying from: (1) a minus 0.25 percent at 0–1 PSIG and 4–5 PSIG, and (2) to a plus 0.25 percent at 1–4 PSIG. Curve A crosses the 100 percent proof line twice, at both 0175 PSIG and 4 PSIG. Curve B represents a continuous integrator having a bourdon type of pressure sensor which includes a radial output which then must be converted to linear motion. As has been noted, such a conversion from radial output to linear motion is a frequent source of error. Curve B of FIG. 4 has an average variation of more than twice that of Curve A, or about 0.5 percent, and varies from a minus 1 percent at 0 PSIG to a plus 0.9 percent at 5 PSIG, crossing the 100 percent proof line at 4 PSIG.

It will be understood that various changes in the details, materials, arrangements of parts and operating conditions which have been herein described and illustrated in order to explain the nature of the invention, may be made by those skilled in the art within the principles and scope of the invention.

Having set forth the nature of the invention, what is claimed herein is:

1. In a low pressure index continuous integrator assembly for measuring the throughput fluid flow of a meter having a pressure range of between 0 to 5 psig, the combination of:
    a. a housing having an upper frame and a lower frame,
    b. a pressure sensing means mounted on the upper frame,
    c. the pressure sensing means communicating with the fluid flow in the meter, and to expand or contract in a straight line responsive to increases or decreases in the pressure of the fluid flow,
    d. a continuous integrator mounted to the lower frame having a ring biased to rotate upon a rotative disc driven from the meter,
    e. the ring to rotate at a variable speed along a radial line on the surface of the disc defining an axis of rotation,
    f. an output shaft driven by the ring at a variable speed responsive to the ring's radial position on the axis of rotation,
    g. a counter driven by the output shaft to indicate the corrected volume,
    h. a link transfer assembly interconnecting the pressure sensing means and the ring,
    i. the link transfer assembly having a first link connected to the pressure sensing means and a last link connected to the ring,
    j. the first link and the last link normally substantially parallel to each other except during periods when the ring is traveling along the axis of rotation to assume a new position of rotative stability responsive to pressure changes,
    k. the first link and last link disposed perpendicular to the axis of rotation,
    l. a plurality of intermediate links pivotally interconnected between the first link and the last link with each of the intermediate links disposed at a substantial right angle at the point of connection to the adjacent links,
    m. at least one of the intermediate links substantially parallel to the axis of rotation,
    n. at least one of the intermediate links substantially parallel to the first link and the last link, and
    o. a fixed pivot formed at the upper frame to interconnect two of the intermediate links at right angles to each other whereby the linear motion of the pressure sensing means will act to crank the intermediate links about the fixed pivot to transmit the motion to the last link which steers the ring in a linear path along the axis of rotation to a new location thereon, corresponding to the new pressure condition sensed at the pressure sensing means.

2. The combination claimed in claim 1 wherein:
    a. one of the intermediate links is connected between the first link and the fixed pivot,
    b. the said one intermediate link is disposed substantially parallel to the axis of rotation,
    c. another intermediate link remote from the said one intermediate link connects to the last link, and
    d. the said another intermediate link is disposed parallel to the axis of rotation.

3. The combination claimed in claim 1 wherein:
    a. the surface of the disc defines a first plane in which the axis of rotation lies, and
    b. the intermediate links are disposed parallel to said first plane.

* * * * *